April 15, 1952 W. L. VERVEST ET AL 2,593,226
PAWL MECHANISM AND ASSEMBLY
Filed Dec. 22, 1948 4 Sheets-Sheet 1

INVENTORS.
WILHELMUS LAMBERTUS VERVEST
GOZEWIJN VAN GELDER
BY Fred M Vogel
AGENT.

INVENTOR.
WILHELMUS LAMBERTUS VERVEST
GOZEWIJN VAN GELDER
BY
Fred M Vogel
AGENT.

April 15, 1952 W. L. VERVEST ET AL 2,593,226
PAWL MECHANISM AND ASSEMBLY
Filed Dec. 22, 1948 4 Sheets-Sheet 4

INVENTORS.
WILHELMUS LAMBERTUS VERVEST
GOZEWIJN VAN GELDER
BY
Fred M Vogel
AGENT.

Patented Apr. 15, 1952

2,593,226

UNITED STATES PATENT OFFICE 2,593,226

PAWL MECHANISM AND ASSEMBLY

Wilhelmus Lambertus Vervest and Gozewijn Van Gelder, Eindhoven, Netherlands, assignors to Hartford National Bank and Trust Company, Hartford, Conn., as trustee Application December 22, 1948, Serial No. 66,682 In the Netherlands February 17, 1948

9 Claims. (Cl. 74—10.2)

A system of locking discs and associated pawls is known, which is referred to as a "pawl mechanism." This system is used in apparatus comprising one or more control-members which have to be moved occasionally into a different, predetermined position.

An apparatus in which such pawl mechanisms are especially suitable is, for example, a transmitter or a receiver for wireless communication, in which the wavelength is regularly varied, it being necessary, each time the apparatus is required to be tuned to a different wavelength, to change the position of a number of control-members, such as condensers, resistances and inductances. The use of pawl mechanisms permits of the movement of the control-members from one position to another to be carried out readily.

The idea is that each shaft serving for the movement of one or more control-members should be provided with a pawl mechanism. The pawl mechanism comprises a locking disc associated with a pawl for any position of such a control-shaft that may be selected. A pawl selector permits of each pawl being caused to co-operate with the locking disc with which it is associated. It may be desirable for the position determined by a locking disc to be changed. For this reason the locking discs are each separately adjustable. When in all the pawl mechanisms of the apparatus the operative pawl has been ejected and a further pawl has been chosen with the use of the pawl selector, all the control-shafts are rotated to the extent of being locked by the pawl chosen. Upon termination of this operation, the new combination of positions of the control-members is obtained and hence in a radio apparatus the new wavelength is set up.

The control-shafts need not be adjusted in succession but may be rotated at a time. For this purpose a common motor may be provided. A device in which this is the case is described in French specification No. 881,525.

As a rule, all the control-shafts will not reach their new positions at a time. For this reason, the use of a common driving device requires the provision of a clutch between the driving shaft and the shaft of the pawl mechanism, which clutch permits the former to continue its rotation after the shaft of the pawl mechanism has been locked. For this purpose use may be made of a friction clutch or with advantage of a coupling which fully separates the two shafts upon a given torque being exceeded. An overload coupling which lends itself particularly for the said purpose is described in French specification 903,072.

The invention has for its object to provide a practical assembly of the overload coupling with the pawl mechanism together with further parts so as to form a structural element.

According to the invention, the overload coupling and the pawl mechanism are arranged side by side, their shafts being parallel to one another, the driven part of the overload coupling comprising a gear wheel. This gear wheel, which will be referred to hereinafter as a "driven wheel" in distinction from other gear wheels to be mentioned hereinafter, meshes with a gear wheel seated on the shaft of the pawl mechanism. The latter gear wheel will be referred to hereinafter as a "pawl mechanism wheel." In addition, the driving shaft of the overload coupling has seated on it a gear wheel which will be referred to hereinafter as the "driving wheel" and which meshes with a gear wheel which rotates freely about the shaft of the pawl mechanism. The latter wheel will be referred to hereinafter as the "transmission wheel."

This arrangement ensures an efficient use of the space which, in many cases (consider for example radio apparatus on board aircraft), is restricted. If the overload coupling is arranged in line with the shaft of the pawl mechanism, the size of the apparatus in the axial direction is increased. At the side of the shaft of the pawl mechanism there is, as a rule, space available to accommodate the overload coupling without increasing the size of the apparatus. In addition to reduction in size, this arrangement has the great advantage of permitting of any number of structural elements of the kind comprising a pawl mechanism and an overload coupling being grouped in a very simple manner so that the drive of only one of these elements results in all of them being actuated at the same time.

Two or more elements according to the invention may be assembled to form a single mechanism, the pawl mechanisms of which are adapted to be moved by one common motor without the necessity of providing for this purpose a shaft for each element, since, if two of such elements are arranged side by side in such manner that their shafts are parallel and the transmission wheel of one element meshes with the driving wheel of the other, and if one of the driving wheels is moved the other driving wheel is carried along therewith in the same direction of rotation through the intermediary of the transmission wheel. A third element may be similarly arranged at the side of the second element and the movement is transmitted to its driving wheel also by a transmission wheel. The shaft system shown in Fig. 1 of French specification No. 881,-525 is thus largely dispensed with.

It is obvious that of two directly intercoupled elements one set of gear wheels formed by a driven wheel and a pawl mechanism wheel must be shifted relatively to the other, so that each pawl mechanism wheel only engages the driven wheel of the element with which it is associated itself. In the third element this set of gear wheels may be flush with the first one, so that nevertheless only two kinds of elements are required to build up a pawl mechanism comprising any number of pawl mechanisms.

In a mechanism built up according to the invention even movement of the pawl selectors may be effected with the use of gear wheels. For this purpose one of the shafts of the overload coupling is provided with a gear wheel adapted to rotate freely about this shaft, which wheel will be referred to hereinafter as the "intermediate wheel" and which meshes with a gear wheel which is adapted to rotate freely about the shaft of the pawl mechanism. The latter wheel will be referred to hereinafter as the "pawl selector wheel."

If all the intermediate wheels and pawl selector wheels are equally spaced apart from the driving and transmission wheels, one pawl selector wheel of an assembly of two or more elements to form a single mechanism engage not only the intermediate wheel of the element with which it is associated but also that of the adjacent element. Consequently, by actuating one of the intermediate wheels or pawl selector wheels of such a mechanism, all the pawl selector wheels will be caused to rotate in the same direction. Since change of position invariably requires equal shifts of all the pawl selectors, the pawl selector wheels may all form part of the same moving system and may thus be arranged in the same plane.

It will frequently be impossible to arrange all the shafts of the elements in the same plane but in a mechanism according to the invention this is not necessary, since the point of engagement of the gear wheels may be chosen at will, at least along a large part of the pitch circle. Consequently, the planes of the shafts of two adjacent elements may be at an angle with one another. The wheel of an element cooperating with a gear wheel of the same element leads, it is true, to the formation of a dead angle, where a second gear wheel cannot penetrate but the remaining part is sufficiently large to enable even the arrangement of two elements side by side or at angle of 90° between the planes of the shafts.

Nevertheless, in practice the arrangement of the element to be coupled may still be a source of trouble. It is desirable for the shafts to be journalled at points on either side of the pawl mechanism in order that they may be prevented from taking up a slanting position. If this condition is satisfied the frame work which serves as a support for the shafts exhibits, by necessity, parts projecting beyond the gear wheels.

Even if the two bearings of a shaft of a pawl selector are located between transmission wheel and pawl selector wheel, there must be a connection to a base plate which supports the entire mechanism and it is only natural that this connection cannot pass across a gear wheel. Such projecting parts of the frame work are liable to hamper coupling at given angles. This would entail the necessity of making the frame work of the various elements from parts having different shapes in accordance with the direction in which the adjacent elements are desired to be coupled.

A further development of the invention materially reduces the number of varieties required. It has resulted in journalling the shafts in two parallel plates of particular shape. These plates each comprise fulcra which project from the gear wheels and in which they may be secured to one another and, if necessary, to a common base plate with the use of transverses. These fulcra are located so far beyond the common plane of the shafts that they do not hamper coupling at a point of this plane. The plates are constructed to constitute images of one another and thus to be interchangeable. By doing so, the projecting fulcrums of the plates are caused to be located on that side of the common plane of the shafts which is opposite to that where they were located prior to interchange. These fulcra are preferably provided outside the space circumscribed by the two planes which are at right angles to the common plane of the shafts and which each pass through one of the shafts, that is to say on either side of this space. If, one of the plates being uppermost, such part of the gear wheels is cleared as enables coupling at a point to the right of the common plane of the shafts, coupling to the left of this plane is enabled with the other plate uppermost (reversed).

However, interchangeability between the right-hand side and the left-hand side is also desired with respect to couping to only one of the gear wheels of the set. The use of the plates referred to would therefore entail the necessity of having nevertheless available four types. If the plates are constructed to be such as to be reversible without being interchanged, the required number of types is halved. However, in this case the bearings have to satisfy requirements of shape which cannot always be fulfilled. Moreover, the ratio between the numbers of the plates of each type thus required also varies with the ratio between the number of elements to be provided on the two shafts on the same side and that to be coupled on different sides of the common plane of the shafts.

According to the invention, a further improvement is achieved by building up each plate from two pieces each of which is the image of the opposite piece of the other plate, so that they are interchangeable. For this purpose, the two pieces of each plate are secured to one another at points which are symmetrically located relatively to the common plane of the shafts.

In order that the invention may be more clearly understood and readily carried into effect, it will now be described with reference to the accompanying drawing, in which

For the sake of clearness Figs. 1, 2 and 3 are drawn in a diagrammatic manner.

Figure 1:
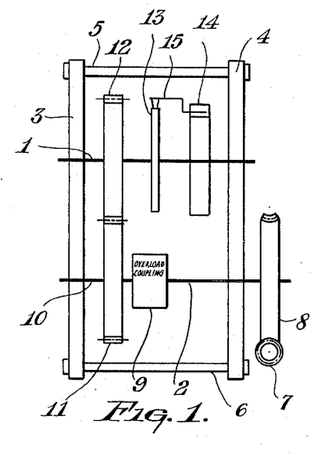
Fig. 1 shows, by way of example, one embodiment of an element according to the invention in its simplest form, projected in a direction at right angles to the common plane of the shafts.
Figure 2:
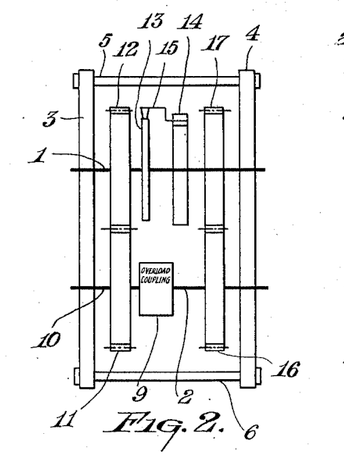
Fig. 2 shows, by way of example, an element according to the invention which is suitable to be combined with a second element to form one mechanism according to the invention, the direction of projection being equal to that of Fig. 1, similarly to Fig. 3, which shows a mechanism according to the invention comprising two elements. The latter figure also shows some few details of an overload coupling which is especially suitable for use with pawl mechanisms.
Figure 3:
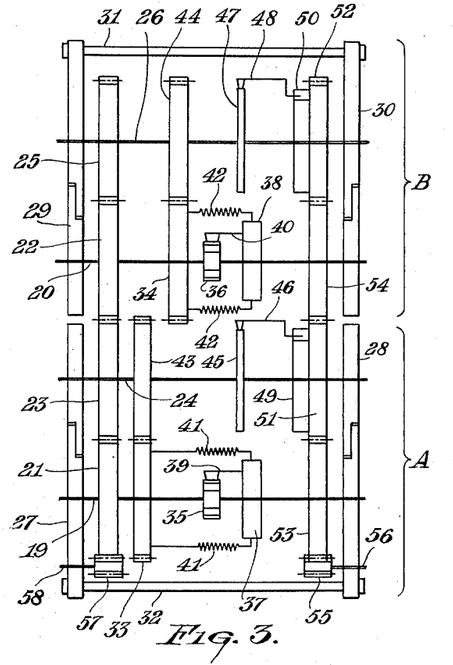

Referring to Figs. 1, 2 and 3, the shafts are shown each in the form of a single line. In order to denote that such a shaft is adapted to rotate in a part, the said line is prolonged in this part. In order to denote that a part follows the rotation of the shaft, the said line is interrupted in that part.

Referring to Fig. 1, 1 designates the shaft of a pawl mechanism. According to the invention, the shaft 2 of the overload coupling is not in line with the shaft 1 but is arranged at the side thereof and parallel thereto. The two shafts are journalled in plates 3 and 4 of a framework. These plates are held by transverses 5 and 6, which may serve in addition to secure the element to a base plate.

The shaft 2 is driven with the use of a worm 7, which meshes with a worm gear 8 seated on the shaft 2. The shaft of the worm may be driven by a motor (not shown). The shaft 2 constitutes the driving shaft of the element. Its movement is transmitted by an overload coupling 9 to a shaft 10 which is in line with the shaft 2. The shaft 10 has seated on it a gear wheel 11, which is referred to as a "driven wheel," because it forms part of the driven part of the overload coupling.

The shaft 1 has also seated on it a gear wheel 12, which is referred to as a "pawl mechanism wheel," because it forms part of the pawl mechanism. The gear wheel 12 meshes with the gear wheel 11.

One of the locking discs of the pawl mechanism, which are firmly seated on the shaft 1, is designated 13. The shaft 1 furthermore supports a pawl selector 14 which is adapted to rotate about this shaft. Of the pawls 15, which are arranged to surround the system of discs 13 only that which is associated with the disc shown is shown in the figure.

The element operates as follows. By turning the pawl selector 14 about the shaft 1 (by means not shown in Figure 1 but indicated in Figure 3 at 51—56) till it occupies the desired position, a given pawl 15 is caused to become operative. The shaft which supports the worm 7 is then set rotating, so that the worm gear 8 and hence the shaft 2 are caused to move. The coupling 9 transfers the movement to the shaft 10, so that the driven wheel 11 rotates and in turn moves the pawl mechanism wheel 12, with the result that the shaft 1 together with the locking discs 13 starts rotating.

The selected pawl 15 is subjected by the pawl selector to a spring pressure (not indicated in the drawing) radially directed towards the centre but it otherwise remains in off-position. This spring pressure may be achieved by an arrangement of parts as shown, for example, in the co-pending application Serial No. 51,605, now Patent Number 2,530,795 of J. M. Unk, for a "Device for Arresting a Shaft by Any One of a Number of Pawls Around the Shaft." The pawl 15 passes over the edge of the rotating disc 13, which has a notch (not shown, but likewise illustrated in the aforesaid application). Upon this notch reaching the pawl 15, the free end of the pawl snaps in and abuts against the wall thereof. The pawl thus prevents further rotation of the disc 13, with the result that the shaft 1 and the gear wheels 12 and 11 are also locked.

The couple of driving forces exerted on the shaft 2, however, has not yet ceased. If the shaft of the worm 7 also drives other pawl mechanism, this couple should not cease to operate until the last pawl mechanism is locked. In order to enable the driving shaft 2 to continue its rotation on the driven shaft 10 being locked, the overload coupling 9 has been arranged between these shafts.

It may be visualised as a friction clutch which is capable of transmitting the torque required for setting the shaft of the pawl mechanism rotating but which tends to slip when the counter-torque exceeds a given value.

After all the pawl mechanisms are thus locked in succession, rotation of the shaft of the worm 7 (so-called after-rotation) may be stopped. If a motor is used for this after-rotation the current for the motor may therefore be switched off.

By the arrangement of the overload coupling at the side of the pawl mechanism in accordance with the invention, the advantage is obtained that the axial dimension of the element is shortened. However, the invention does not tell to full advantage unless a further gear wheel is associated with the element.

The various pawl mechanisms associated with the same apparatus will not always have their shafts located in one plane. This involves the necessity of a complex transmission system to link up the motor or the hand lever which serves for after-rotation with each of the pawl mechanisms. Such a transmission system is shown, for example, in Fig. 1 of French specification 881,525.

If the driving of the pawl mechanism is effected by means of a conventional gear wheel, instead of the worm gear 8, it may be used to drive a second element which is provided with an identical gear wheel. For the purpose these gear wheels are caused to mesh with one another then the shaft of the second element rotating, however, in the opposite direction. As a rule, it will therefore be impossible for this second element to comprise similar parts as the first one and, at any rate, it must be composed in a different manner. Moreover, when designing the control-members of the apparatus to which the pawl mechanisms are linked, this difference in direction of rotation must be allowed for. It will therefore be preferred to provide an intermediate wheel which intercouples the shafts of the pawl mechanisms in order to ensure in this manner rotation of the pawl mechanisms in the same sense of rotation.

The interposition of this intermediate wheel has the additional advantage of permitting the use of gear wheels having a smaller diameter with a given relative spacing between the pawl mechanism shafts.

According to the invention, the shaft of the pawl mechanism itself is used to support this intermediate wheel. In distinction from a further, loose wheel, which will be described hereinafter and which has a different function, it is referred to as the "transmission wheel."

Fig. 2 shows diagrammatically an element provided with such a transmission wheel. Corresponding parts are designated in Figs. 1 and 2 by like reference numerals. The worm wheel 8 of Fig. 1 is replaced in the element of Fig. 2 by a gear wheel 16, which is referred to as the "driving wheel." It meshes with the transmission wheel 17 which rotates freely about the shaft 1, of the pawl mechanism. The latter gear wheel may have coupled to it the driving wheel of a second element. On the mechanism being caused to become operative the latter driving wheel rotates in the same direction as the driving wheel of the first element. The spacing between the shafts of two adjacent pawl mechanisms is not more than twice the spacing between the shafts 1 and 2.

Much time is saved when displacement of the pawl selectors to a new position occurs at the same time for all the elements of the mechanism. In the event of the pawl selectors being driven by a motor, it will be preferred to have them simultaneously controlled by the same motor. This can be realized in a simple manner in a mechanism built up from intercoupled elements according to the invention. For this purpose the shafts of the element are provided with a supplementary system of gear wheels meshing with one another, of which one rotates freely about one of the shafts of the overload coupling and the other rotates freely about the shaft of the pawl mechanism, these wheels being arranged in such manner that, when a second element is provided by coupling they are again coupled with the corresponding set of loose gear wheels of this element. Fig. 3 shows diagrammatically, by way of example, a mechanism to which this has been applied. It comprises two elements A and B but it may be extended at will to comprise further elements. Since the arrangement of the elements shown in Fig. 3 is slightly different from that of the elements shown in Figs. 1 and 2, different reference numerals are used in Fig. 3.

In the element A, 19 designates the driving shaft of the overload coupling and in the element B the corresponding shaft is designated 20. The shaft 19 has firmly seated on it a driving wheel 21 and the shaft 20 the driving wheel 22. These driving wheels are intercoupled by a transmission wheel 23, which is loosely seated on the pawl mechanism shaft 24. The element B also has a transmission wheel 25, which is loosely seated on the pawl mechanism shaft 26 of this element and which in turn serves to enable coupling of the element B with a further element.

The shafts are journalled in plates 27, 28 and 29, 30 respectively of a framework. For a reason which will be explained hereinafter, these plates are made in two pieces. They are secured to one another by transverses of which two, viz. 31 and 32, are shown. The driving shafts 19 and 20 are each coupled by an overload coupling to a driven wheel 33 and 34 respectively.

Figure 10:
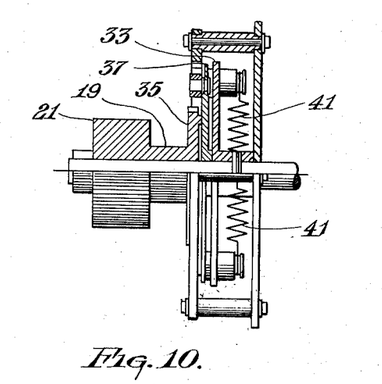
Figs. 10, 11 and 12 show the overload coupling structure.
Figure 11:
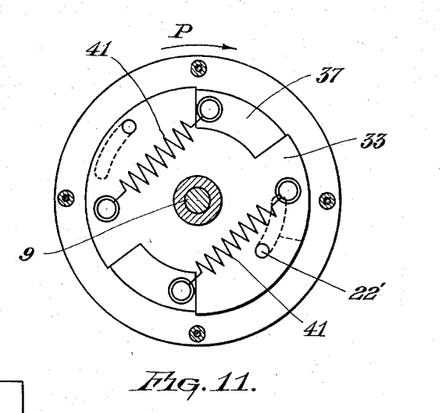
Figure 12:
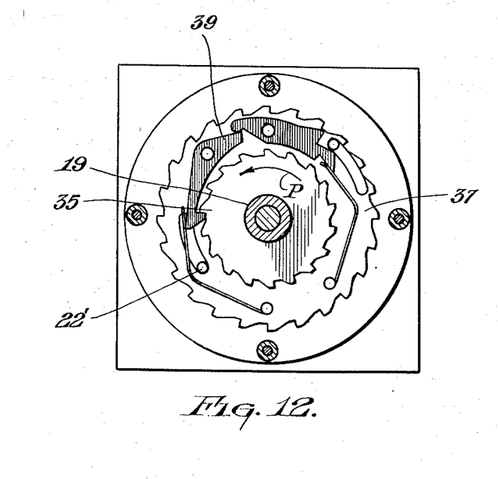

In this case the overload coupling is a device in which the couple of driving forces is transmitted by an auxiliary member which by springs is linked up with the driving shaft and by a system of pawl and pawl wheel with the driven shaft. In such a device, when the driven shaft is locked, the relative rotation of the auxiliary member with respect to the driven shaft results in the coupling between driving shaft and auxiliary member being thrown out of gear. This rotation also results in the springs which link up the auxiliary member with the driven shaft being stressed. On the shafts being decoupled, a coupling between the auxiliary member and a locking member is thrown into gear and provides that the springs remain under stress so that they continue to exert a torque on the stationary shaft, with the result that, as soon as this shaft is unlocked it will engage in moving and perform a rotation with respect to the auxiliary member which is still stationary. This rotation results in that the coupling between driving shaft and auxiliary member again becomes operative. An example of such a device is described in French specification 903,072. Figures 10–12 show such an example of the particular overload coupling structure schematically illustrated in Figures 1–3. The reference numbers correspond to those of Figure 3. As shown, a driving shaft 19 drives a pawl wheel 35 securely mounted thereon and a pawl 39 arranged on auxiliary member 37. Springs 41 link auxiliary member 37 and the driven wheel 33. Pins 22 act as displacement means to eject the pawl 39 from the wheel 35 upon overload conditions.

In Fig. 3 the pawl wheels of the overload coupling which are seated on the driving shafts are designated 35 and 36 and the pawls arranged on the auxiliary members 37 and 38 are designated 39 and 40. The springs linking the auxiliary member with the driven wheel are designated 41 and 42 respectively. Although they are shown (in exaggerated form in Figure 3) in the form of helical springs the axis of which is parallel to the shaft 19 these springs link in actual fact points of which the junction line across the shaft 19 at right angles as shown in Figures 10 and 11.

The driven wheel 33 engages the pawl mechanism wheel 43 of the element A and the driven wheel 34 engages the pawl mechanism wheel 44 of the element B. Since the driven wheel 33 must move only the pawl mechanism shaft of the element with which it is associated itself, and not that of an adjacent element, the set of gear wheels 33 and 43 is slightly shifted relatively to the set of gear wheels 34 and 44. The driven wheel and the pawl mechanism wheel of an element which is coupled with the element B may again be located in the same plane as the wheels 33 and 43.

The pawl mechanism shaft 24 has seated on it a system of locking discs, each of which is secured to this shaft so as to occupy a predetermined position and of which one, 45, is shown. The figure furthermore shows a pawl 46 which cooperates with the locking disc 45 and it shows of the element A also a single locking disc 47 seated on the shaft 26 and the pawl 48 co-operating with this disc. The pawl mechanism shaft 24 supports a pawl selector 49 and the pawl mechanism shaft 26 supports a pawl selector 50. Each of these pawl selectors is secured to a gear wheel 51 and 52 respectively, which will be referred to as the "pawl selector wheel." Together with the wheels (intermediate wheels) 53, which are seated freely on the shaft 19, and 54, which are seated freely on the shaft 20, the gear wheels 51 and 52 form a system of intercoupled gear wheels.

Figure 3A:
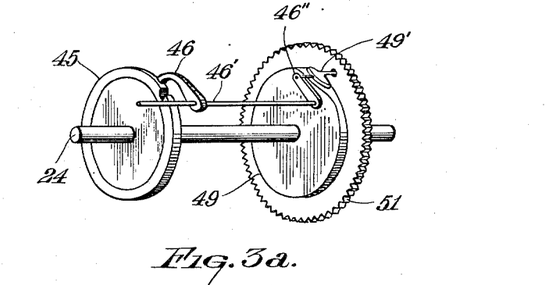
Fig. 3a shows a preferred selector mechanism.

In Figure 3a, a locking disk 45 is fixedly mounted on the pawl mechanism shaft 24. Loosely mounted on shaft 24 is a pawl selector 49 which is secured to the pawl selector wheel 51. A pawl 46 is supported on a pawl lever 46′ and is controlled by a second arm 46″ (also supported on lever 46′) by spring means 49′ which maintain the arm 49' in contact with the cam surface of pawl selector 49.

The mechanism operates as follows. In order to move the pawl mechanisms from the position which they occupy to a new position, the intermediate wheel 53 is turned with the use of a pinion 55 which is seated on an adjusting shaft 56. Thus the pawl selector wheel 51, the intermediate wheel 54 and the pawl selector wheel 52 are simultaneously caused to move, whilst all the shafts of the elements remain stationary. The movement of the adjusting shaft 56 is continued until the pawl selector wheels have reached the newly selected position.

Next the shafts of the pawl mechanisms are required to be moved into the position which corresponds to the selected position of the pawl selectors. This may be carried out, for example, with the use of a pinion 57 which is firmly seated on a drive shaft 58 and which engages the driving wheel 21 of element A. Rotation of said drive shaft 58 by a prime mover (not shown) causes the driving wheels 21 and 22 and the transmission wheels 23 and 25 to move, with the result that the shafts 19 and 20 rotate similarly to the driving shafts of the other elements which may be coupled through the transmission wheel 25 to the moving system formed by pinion 57 and wheels 21, 23 and 22.

The movement of shaft 19 is transmitted by the pawl wheel 35 through the pawl 39 to the auxiliary member 37 and hence through the springs 41 to the driven wheel 33. Similarly, the movement of shaft 20 is transmitted through pawl wheel 36, pawl 40, auxiliary member 38 and springs 42 to the driven wheel 34. Consequently, the pawl mechanism wheels 43 and 44 are also caused to move and thus the locking discs 45 and 47. It may be assumed that in the element A first of all the selected pawl 46 reaches the notch in the edge of the locking disc 45 and the pawl mechanism shaft 24 is locked. Whereas the driving and transmission wheels continue to rotate, the wheels 43 and 33 are locked. However, the auxiliary member 37 is rotated further with the result that the springs 41 are under additional stress. Due to the rotation of the auxiliary member 37 relatively to the stationary wheel 33 the pawl 39 is ejected from the pawl wheel 35. The device with the use of which this is effected is not shown on the drawing. The auxiliary member 37, which thus clears the driving shaft 19, tends to turn backwards under the pull of the springs 41. This is prevented by a coupling between this auxiliary member and a stationary locking member. This coupling (not shown) may be a simple free-wheel coupling, that is to say a device which permits rotation in one direction only and, for example, may take the form of a pawl and ratchet device of conventional design. Consequently, the springs 41 remain under stress and the auxiliary member 37 keeps clear of the pawl wheel 35, which is still rotating.

The pawl mechanism of the element A has now taken up the selected position and is accurately maintained in it, since the stressed springs 41, through the driven shaft 33 and the pawl mechanism wheel 43 urge the wall of the notch in the locking disc 45 against the pawl 46, which cannot yield and which accurately determines the position of the shaft 24.

Meanwhile the wheels 21, 23 and 22 continue to rotate and the locking disc 47 slides on under the selected pawl 48. This continues until the notch in the edge of the locking disc 47 has reached the pawl 48 and this pawl prevents further movement of the disc 47 and hence also of the shaft 26 and the wheels 44 and 34. Next, the overload coupling of the element B becomes operative and interrupts the linkage between pawl wheel 36 and auxiliary member 38. The wheels 21 and so forth are even then permitted to turn on, which may be necessary for the control of a next following element.

If in the element B the locking position had been reached sooner than in the element A, the order of locking would have been interchanged but the operation would otherwise have been identical.

By arranging the shafts side by side and utilising these shafts for the arrangement of transmission and intermediate wheels a particularly compact structure is ensured which economizes much space and which by reason of the possibility of extending the mechanism at will in a most simple manner is particularly attractive.

An efficient improvement which enhances the choice of positioning the elements to be intercoupled relatively to one another may be clearly seen from Figs. 4, 5, 6 and 7. They show a number of elements according to the invention viewed in the direction of the shafts, the transmission wheels being designated 59 and the driving wheels 60. They are arranged for the greater part behind the mounting plates in which the shafts are journalled, so that only part of the toothed rim is showing in which the pitch circle is drawn as a dot-and-dash line. The mounting plates have fulcra 61 and 62 extending beyond the gear wheels, at which they are secured together with the use of transverses (designated in Fig. 3 by 31 and 32). These fulcra and transverses may be in the way when coupling a next following element. Thus, for example, in the element shown in Fig. 4 it is impossible to cause the driving wheel of a further element to engage the wheel 59 at a point which on the left-hand side of the common plane 63 of the shafts is spaced apart from the top 64 by an arc distance of 45°. It is also impossible to couple the wheel 60 with the transmission wheel of a further element at a point which on the left-hand side of the plane 63 is spaced apart from the top 65 by an arc distance of 45°. In the former case the fulcrum 61 forms an obstacle, in the latter case the fulcrum 62.

Figure 4:
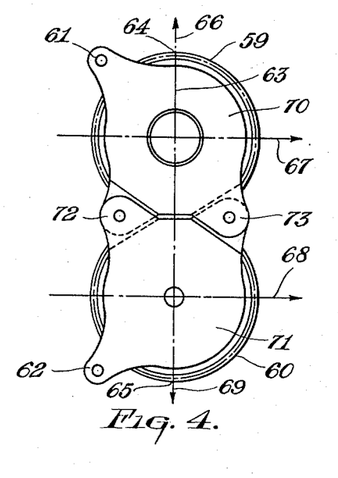
Figs. 4, 5, 6 and 7 show how the use of interchangeable mounting plates permits of coupling in various directions.

The fulcra are deliberately not arranged in the plane 63, although for the sake of solidity, they have been arranged outside the space circumscribed between the planes passing through the shafts at right angles to the plane 63. This ensures that a next following element can be coupled on either side to a point of the plane 63, it being possible, if necessary, to cause the common plane of the shafts of the said further element to coincide with the plane 63.

As an alternative, coupling is possible to points located in the angle formed between the arrows 66 and 67 and that between the arrows 68 and 69.

Figure 5:
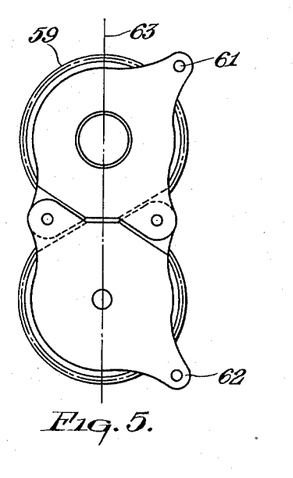

The plates are constructed to be such that the upper plate, i. e. that which in the drawing faces the observer and which covers the wheels 59 and 60, is the image of the lower plate, so that these plates are interchangeable. If they are interchanged the element exhibits the form shown in Fig. 5, the fulcra 61 and 62, which in Fig. 4 were directed to the left being directed to the right, so that in the element shown in Fig. 5 coupling of a further element is possible on the left-hand side. For coupling in the direction of the plane 63 it is immaterial whether the plates are arranged as shown in Fig. 4 or as shown in Fig. 5.

Figure 6:
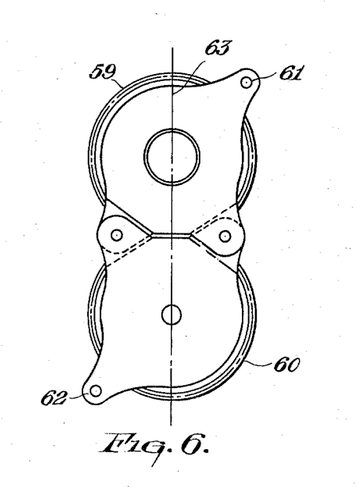
Figure 7:
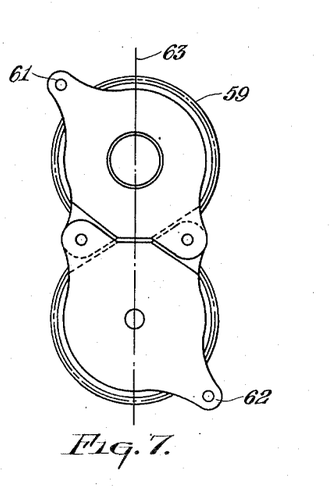

Since it may be desired to couple a further element to the transmission wheel on the right-hand side and to the driving wheel on the left-hand side or vice versa, it is necessary that also plates shaped in the form shown in Fig. 6, should be available the fulcra 61 and 62 being arranged on either side of the plane 63, and the arrangement shown in Fig. 7 being obtained by interchanging the plates.

However, it has been found to be sufficient to use only two kinds of plates, that is to say the same number of each kind, by building up the plates from two pieces 70 and 71, which are each separately interchangeable with the corresponding piece of the second plate. They are secured together with the use of attachment tags 72 and 73. These tags are of half the thickness of the plate and moreover one tag is on the upper side and the other on the lower side of the plate. The two parts 70 and 71 are therefore located in the same plane. This construction permits of realizing all of the four combinations shown in Figs. 4, 5, 6 and 7. If the construction of the bearings permits of making the pieces of the plates reversible, it is even possible to achieve the advantage of a single plate type for all the combinations.

It is true that fully identical plates might be used at either end of the shafts by providing the supporting tags 61 and 62 in the line of intersection with the plane 63 but this would render coupling in the direction of the arrows 66 and 69 impossible.

Figures 8, 9:
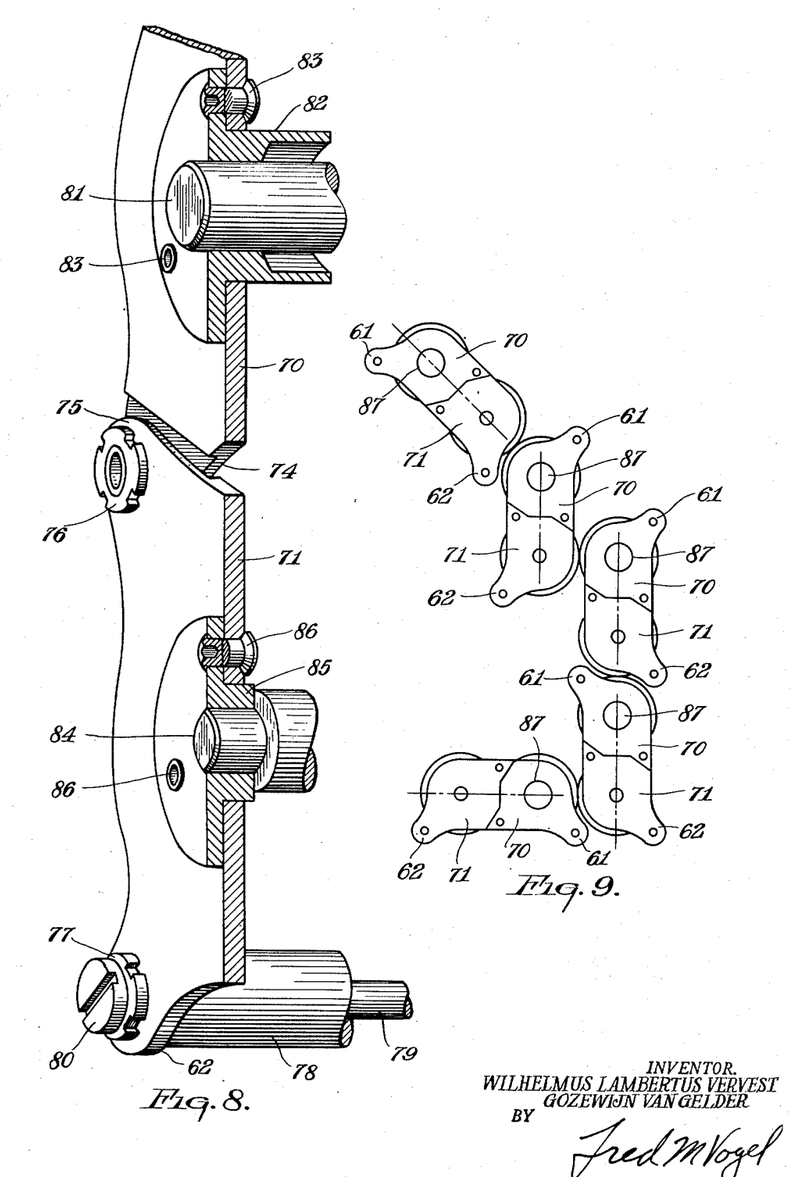
Fig. 8 is a perspective view of the manner in which the two parts of such plates are assembled.
Fig. 9 shows a mechanism according to the invention built up from five elements.

Fig. 8 is a perspective view of one of the plates and of part of the shafts. The figure, in which part of the plate is broken away, shows how the parts of the plates inter-engage one another. It is seen how a tag 74 of the upper part 70 engages a tag 75 of the lower part 71 and how these tags are clamped together by a bolt (transverse) and nut 76. The part 71 is shown provided with a supporting tag 62, which with the use of a nut 77 is secured to a hollow bar 78 (transverse). This bar is traversed by a bolt 79 which comprises a head 80 and is adapted to be screwed into a base plate on the other side to secure the element thereto. At the other end the bar is secured to a corresponding supporting tag of the other plate.

Fig. 8 furthermore shows the end of the shaft of the pawl mechanism 81 which end bears in a sleeve 82 which with the use of a flange is secured to the plate by rivets 83. The plate arranged on the other side of the pawl mechanism has a fully identical sleeve but this extends to the other side, that is to say to the left.

In addition, the figure shows the end of the driving shaft 84 which rotates in a sleeve 85 secured to the plate with the use of rivets 86. The plate arranged on the other side also has such a sleeve, the flange of the sleeve being, however, arranged on the opposite side.

Finally Fig. 9 shows, by way of example, the coupling of five elements according to the invention, the pawl mechanism shafts 87 being spaced apart differently and the planes of the shafts being, as an alternative, in line or at an angle with one another or else parallel to one another.

What we claim is:

1. A drive mechanism comprising; a housing, a pair of shafts rotatably mounted in said housing and positioned in parallel relationship with respect to each other, a gear wheel fixedly mounted on one of said shafts for rotation therewith, a driven gear wheel rotatably mounted on the other of said shafts and in meshing engagement with said gear wheel, overload coupling means mounted on said other shaft and detachably coupling said driven gear wheel to said other shaft, a driving gear wheel adapted to be rotated and fixedly mounted on said other shaft for rotation therewith, a transmission gear wheel rotatably mounted on said one shaft and in meshing engagement with said driving gear wheel.

2. A pawl mechanism comprising; a housing, a pair of shafts rotatably mounted in said housing and positioned in parallel relationship with respect to each other, a gear wheel fixedly mounted on one of said shafts for rotation therewith, a pawl selector gear wheel rotatably mounted on said one shaft, a driven gear wheel rotatably mounted on the other of said shafts and in meshing engagement with said gear wheel, overload coupling means mounted on said other shaft and detachably coupling said driven gear wheel to said other shaft, a driving gear wheel adapted to be rotated and fixedly mounted on said other shaft for rotation therewith, a transmission gear wheel rotatably mounted on said one shaft and in meshing engagement with said driving gear wheel, and an intermediate gear wheel adapted to be rotated and rotatably mounted on said other shaft and in meshing engagement with said pawl selector gear wheel.

3. A pawl mechanism comprising; a housing, a pair of shafts rotatably mounted in said housing and positioned in parallel relationship with respect to each other, a gear wheel and a notched locking disc each fixedly mounted on one of said shafts for rotation therewith, a pawl selector gear wheel rotatably mounted on said one shaft, pawl means actuatable by said pawl selector gear wheel for engaging the notch in said locking disc, a driven gear wheel rotatably mounted on the other of said shafts and in meshing engagement with said gear wheel, overload coupling means mounted on said other shaft and detachably coupling said driven gear wheel to said other shaft, a driving gear wheel adapted to be rotated and fixedly mounted on said other shaft for rotation therewith, a transmission gear wheel rotatably mounted on said one shaft and in meshing engagement with said driving gear wheel, and an intermediate gear wheel adapted to be rotated and rotatably mounted on said other shaft and in meshing engagement with said pawl selector gear wheel.

4. A pawl mechanism assembly comprising; a first and a second housing, each of said housings in turn comprising; a pair of shafts rotatably mounted therein and positioned in parallel relationship with respect to each other, a gear wheel and a notched locking disc each fixedly mounted on one of said shafts for rotation therewith, a pawl selector gear wheel rotatably mounted on said one shaft, pawl means actuatable by said pawl selector gear wheel for engaging the notch in said locking disc, a driven gear wheel rotatably mounted on the other of said shafts and in meshing engagement with said gear wheel, overload coupling means mounted on said other shaft and detachably coupling said driven gear wheel to said other shaft, a driving gear wheel fixedly mounted on said other shaft for rotation therewith, a transmission gear wheel rotatably mounted on said one shaft and in meshing engagement with said driving gear wheel, and an intermediate gear wheel rotatably mounted on said other shaft and in meshing engagement with said pawl selector gear wheel; said first and second housings being so disposed with relation to each other and said gear wheels being so disposed axially of said shafts that said transmission gear wheel of said first housing meshes also with said driving wheel of said second housing, said pawl selector gear wheel of said first housing meshes with said intermediate gear wheel of said second housing, and said gear wheel of said first housing is out of meshing engagement with said driven wheel of said second housing.

5. A drive mechanism comprising; a housing, said housing comprising a pair of parallel plates, a pair of shafts rotatably mounted in said plates and positioned in parallel relationship with respect to each other, said plates being substantially images of each other and unsymmetrical relative to the common plane of said shafts as by like projections beyond said gear wheels, whereby the projections may be shifted to the other side of said common plane by interchanging said plates, a gear wheel fixedly mounted on one of said shafts for rotation therewith, a driven gear wheel rotatably mounted on the other of said shafts and in meshing engagement with said gear wheel, overload coupling means mounted on said other shaft and detachably coupling said driven gear wheel to said other shaft, a driving gear wheel adapted to be rotated and fixedly mounted on said other shaft for rotation therewith, a transmission gear wheel rotatably mounted on said one shaft and in meshing engagement with said driving gear wheel.

6. A drive mechanism comprising; a housing, said housing comprising a pair of parallel plates, a pair of shafts rotatably mounted in said plates and positioned in parallel relationship with respect to each other, said plates being substantially images of each other and unsymmetrical relative to the common plane of said shafts as by like projections beyond said gear wheels, each of said plates comprising two similar sections secured together at points lying symmetrically of the common plane of the shafts, whereby the projections may be shifted to the other side of said common plane by interchanging said plates, a gear wheel fixedly mounted on one of said shafts for rotation therewith, a driven gear wheel rotatably mounted on the other of said shafts and in meshing engagement with said gear wheel, overload coupling means mounted on said other shaft and detachably coupling said driven gear wheel to said other shaft, a driving gear wheel adapted to be rotated and fixedly mounted on said other shaft for rotation therewith, a transmission gear wheel rotatably mounted on said one shaft and in meshing engagement with said driving gear wheel.

7. A drive mechanism comprising; a housing, said housing comprising a pair of parallel plates, a pair of shafts rotatably mounted in said plates and positioned in parallel relationship with respect to each other, said plates being substantially images of each other and unsymmetrical relative to the common plane of said shafts as by like projections beyond said gear wheels, and transverse rods joining said projections on one of said plates to said corresponding projections on the other of said plates, whereby the projections may be shifted to the other side of said common plane by interchanging said plates, a gear wheel fixedly mounted on one of said shafts for rotation therewith, a driven gear wheel rotatably mounted on the other of said shafts and in meshing engagement with said gear wheel, overload coupling means mounted on said other shaft and detachably coupling said driven gear wheel to said other shaft, a driving gear wheel adapted to be rotated and fixedly mounted on said other shaft for rotation therewith, a transmission gear wheel rotatably mounted on said one shaft and in meshing engagement with said driving gear wheel.

8. A drive mechanism comprising; a housing, a pair of shafts rotatably mounted in said housing and positioned in parallel relationship with respect to each other, a gear wheel fixedly mounted on one of said shafts for rotation therewith, a driven gear wheel rotatably mounted on the other of said shafts and in meshing engagement with said gear wheel, overload coupling means mounted on said other shaft and detachably coupling said driven gear wheel to said other shaft, a driving gear wheel fixedly mounted on said other shaft for rotation therewith, a transmission gear wheel rotatably mounted on said one shaft and in meshing engagement with said driving gear wheel, and means actuatable from outside said housing for rotating said driving gear wheel.

9. A pawl mechanism comprising; a housing, a pair of shafts rotatably mounted in said housing and positioned in parallel relationship with respect to each other, a gear wheel fixedly mounted on one of said shafts for rotation therewith, a pawl selector gear wheel rotatably mounted on said one shaft, a driven gear wheel rotatably mounted on the other of said shafts and in meshing engagement with said gear wheel, overload coupling means mounted on said other shaft and detachably coupling said driven gear wheel to said other shaft, a driving gear wheel fixedly mounted on said other shaft for rotation therewith, a transmission gear wheel rotatably mounted on said one shaft and in meshing engagement with said driving gear wheel, an intermediate gear wheel rotatably mounted on said other shaft and in meshing engagement with said pawl selector gear wheel, means actuatable from outside said housing for rotating said driving gear wheel, and other means actuatable from outside said housing for rotating said intermediate gear wheel.

WILHELMUS LAMBERTUS VERVEST.
GOZEWIJN VAN GELDER.

REFERENCES CITED

The following references are of record in the file of this patent:

UNITED STATES PATENTS

| Number | Name | Date |
|---|---|---|
| 2,449,079 | May | Sept. 14, 1948 |